United States Patent [19]
Cocciemiglio, Jr.

[11] Patent Number: 5,722,551
[45] Date of Patent: Mar. 3, 1998

[54] CRATE ASSEMBLY AND PANEL CONNECTING CLIP

[76] Inventor: Dominick Cocciemiglio, Jr., 1300 E. Devon Ave., Elk Grove Village, Ill. 60007-5831

[21] Appl. No.: 684,703

[22] Filed: Jul. 19, 1996

[51] Int. Cl.⁶ .................................................. B65D 90/04
[52] U.S. Cl. .................................................. 220/4.33
[58] Field of Search .................... 220/4.33, 440, 220/442, 669, 670, 4.34

[56] References Cited

U.S. PATENT DOCUMENTS

| | | | |
|---|---|---|---|
| 3,266,656 | 8/1966 | Kridle | 220/4.33 |
| 5,497,895 | 3/1996 | Rudbach | 220/4.33 |
| 5,638,973 | 6/1997 | Dewey et al. | 220/4.33 |

FOREIGN PATENT DOCUMENTS

94/01333  1/1994  WIPO ..................... 220/4.33

Primary Examiner—Joseph M. Moy
Attorney, Agent, or Firm—Douglas B. White

[57] ABSTRACT

The panel connecting clip herein exhibits paired, transversely positioned, panel receiving channels. A ridge is provided along at least one side of each channel to engage a groove cut in the panel. A crate assembly is formed by employing the connector clips along each edge of the enclosure, including the top and bottom edges. By forming the connector clips of flexible material, the panel edges are easily pushed into the channel, forcing the channel apart sufficiently to allow the panel edge to slide past the ridge. When the panel is fully inserted, the ridge of the connector clip snaps into the groove of the panel to secure the panel in position.

10 Claims, 4 Drawing Sheets

CRATE ASSEMBLY AND PANEL CONNECTING CLIP

BACKGROUND OF THE INVENTION

1. Field of the Invention

The present invention relates to crates for shipping use and more particularly to a new crate assembly and a panel connecting clip to accomplish the assembly.

2. Description of the Prior Art

The need for a crate assembly system for constructing shipping crates or other multiple panel structures which facilitate their assembly and reuse has been well appreciated. Typical of traditional systems has been the use of flexible metal straps for securing panels together to form a crate. When the crate is opened, the straps are cut and discarded, and reassembly is accomplished with the use of new straps.

In another prior art design (U.S. Pat. No. 3,563,578) screws are inserted into side panels such that the screw heads protrude into slots formed in the base of the crate. Of course the drawback in this design is the requirement that screws must be individually accurately positioned and a specially contoured slot must be formed into the base. Additionally, no device is provided to connect side panel to side panel.

More recently, a panel fastening device (U.S. Pat. No. 4,139,113) presented a metal spring clip which spans the corner formed by adjacent panels to engage detent hardware positioned on the panels. This system suffers from a similar deficiency of the above-mentioned crate, in that specific hardware must be laboriously positioned individually to accurately mate with the spring clips.

SUMMARY OF THE INVENTION

The present invention provides a novel panel connector clip and crate assembly which achieves the long sought quick assembly and disassembly but without the need to laboriously attach and accurately position custom hardware.

The panel connector clip herein exhibits paired, transversely positioned, panel receiving channels. A ridge is provided along at least one side of each channel to engage a matching groove pre-cut into the panels used to form the crate. A crate assembly is formed by employing the connector clips along each edge of the crate enclosure, including the top and bottom edges. By forming the connector clips of flexible material, the panel edges are easily pushed into the channel, forcing the channel apart to allow the panel to slide past the ridge. When the panel is fully inserted, the ridge of the connector clip snaps into the groove of the panel and secures the panel in position.

While the invention will be described in connection with a preferred embodiment, it will be understood that it is not the intent to limit the invention to that embodiment. On the contrary, it is the intent to cover all alternatives, modifications, and equivalents as may be included within the spirit and scope of the invention as defined by the appended claims.

DESCRIPTION OF THE PREFERRED EMBODIMENT

Figure 1:
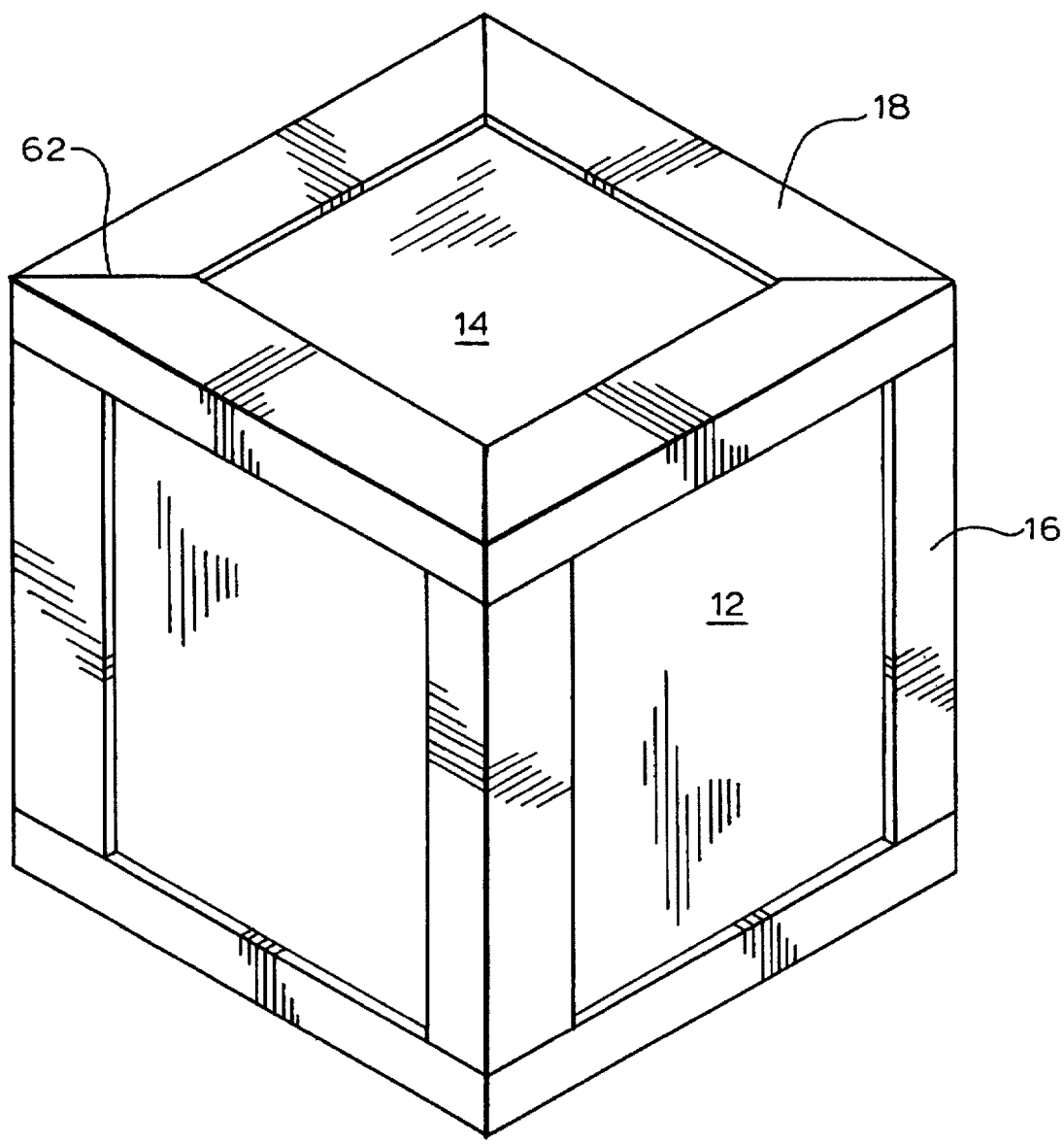
FIG. 1 is a perspective view of an assembled crate employing the panel connecting clip of the present invention.

Turning first to FIG. 1 there is shown a crate assembled with a panel connecting clip in accordance with the present invention. This crate employs side panels 12, top and bottom panels 14, side panel connecting clips 16, and top and bottom panel connecting clips 18.

Figure 4:
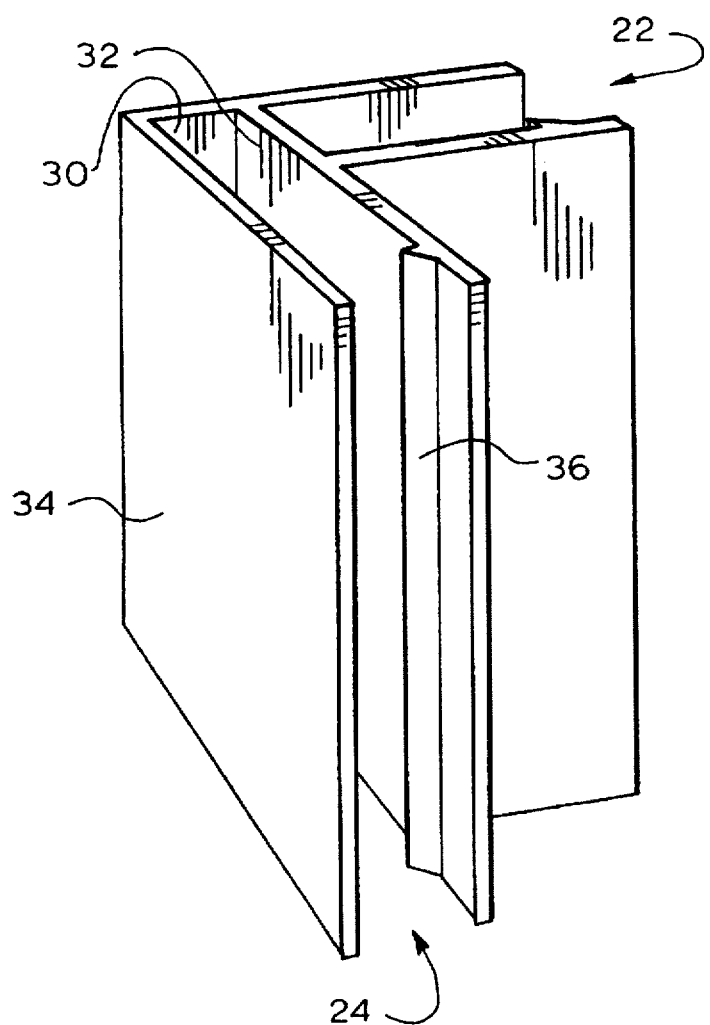
FIG. 4 is a perspective view of a panel connecting clip of the present invention.
Figure 5:
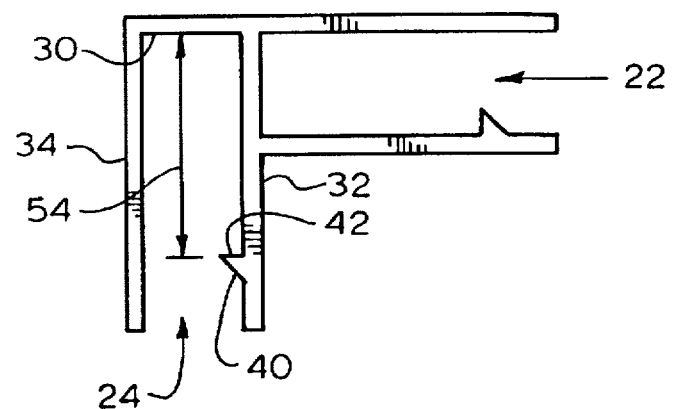
FIG. 5 is a top view of the clip of FIG. 4.

The panel connecting clip of the preferred embodiment (FIGS. 4, 5) presents paired channels 22 and 24, mounted transversely relative to each other. Each channel includes a base 30, an inner side wall 32 and an outer side wall 34, and in the embodiment shown in FIGS. 4 and 5, the base of one of the channels abuts the inner side wall of the paired channel. Along the inner side wall within each channel and spaced from the base 30 of each channel, a ridge 36 extends longitudinally of the channel (parallel to the base 30). This ridge, in cross section (FIG. 5), forms a projection from the side wall having a forward sloping front side 40 and a rear catch side 42. (In the preferred embodiment, this rear catch side projects perpendicularly from the side wall into the channel.)

Figure 2:
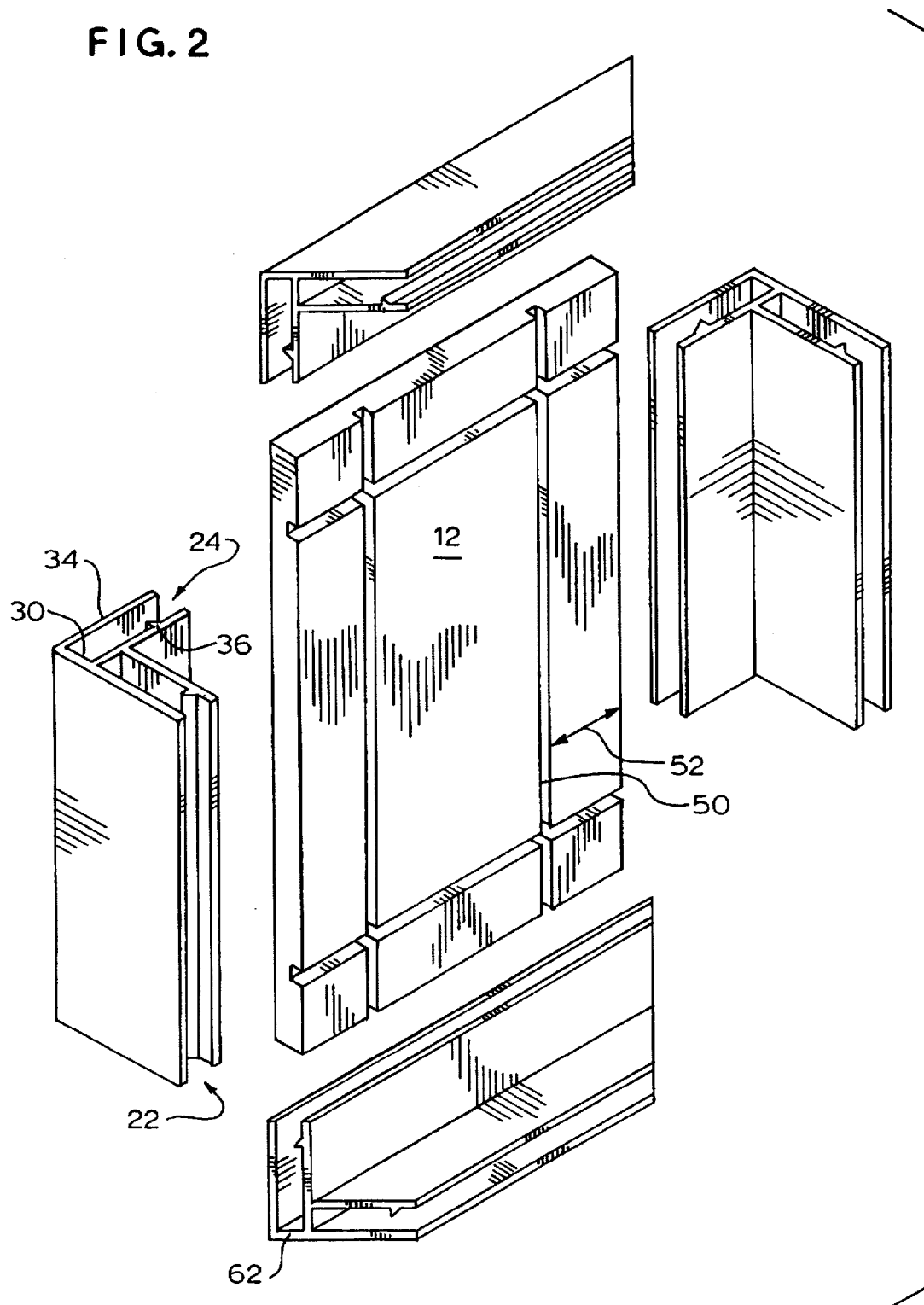
FIG. 2 is an exploded view of a portion of the crate of FIG. 1.
Figure 3:
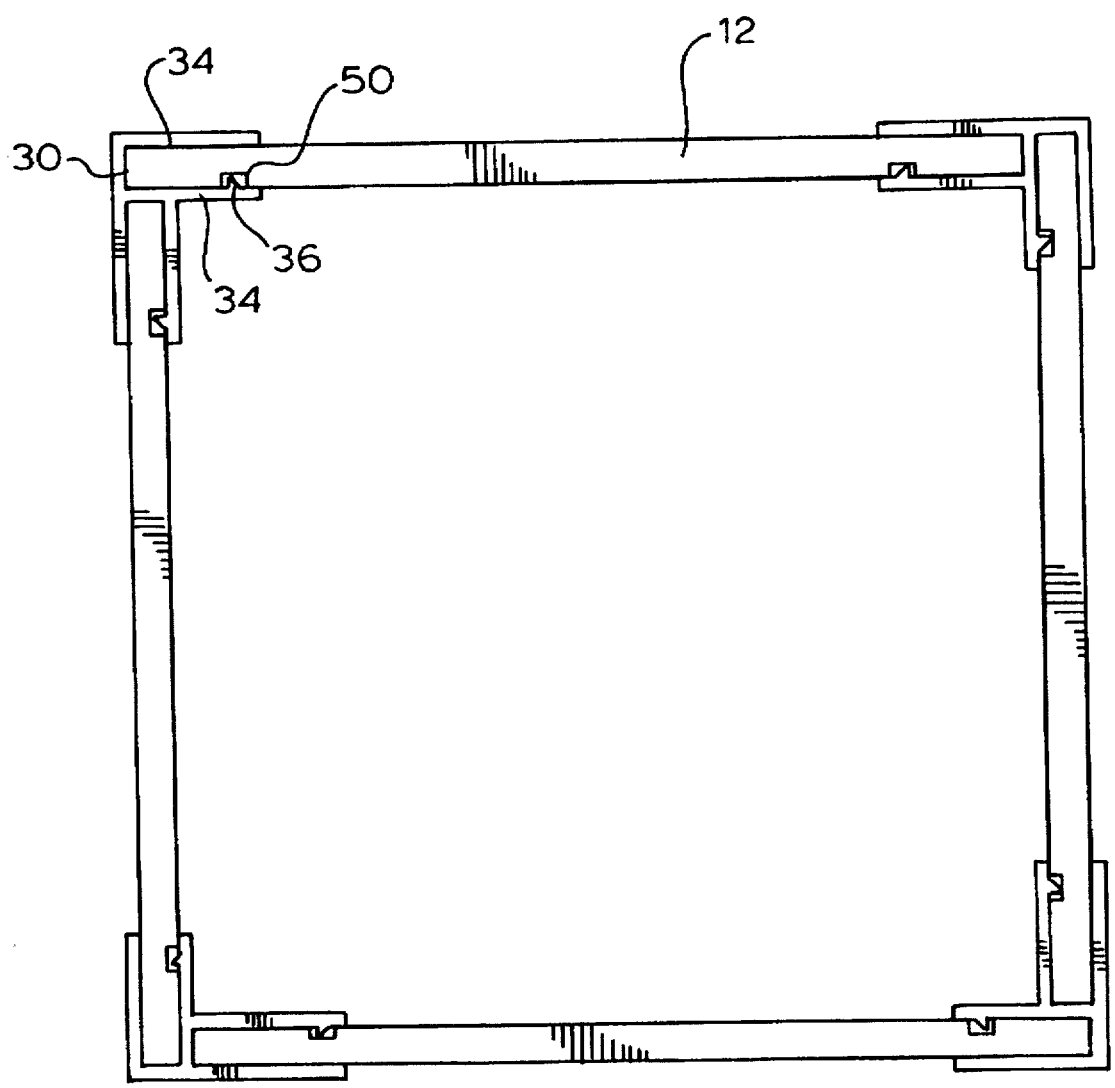
FIG. 3 is a cross section view of the assembled crate of FIG. 1.

Assembly of a crate by joining panels with the panel connecting clip is illustrated best in FIG. 2. A panel 12 is first pre-cut with grooves 50, the outer edges of which are spaced from the edges of the panel by a distance 52 which equals the distance 54 between the base of the channel and the catch side 42 of the ridge. The width of the groove is cut sufficiently wide to accommodate the width of the ridge. Consequently, the connector clip may be either slid onto the panel endwise, by aligning the ridge of the connector clip with groove; or alternatively, by utilizing the flex in the side walls of the connector clips, the panels can be pushed directly into the channel. When the panel edge is pushed against the sloping side of the ridge, the channel of the connector clip spreads slightly and allows the panel to slide past. Once the groove envelops the ridge, the resiliency of the connector clip causes the ridge to snap into the groove and thereby to engage the panel.

Attachment of the panel connecting clips is repeated on all sides of all panels, including the top and bottom, to complete a crate. However, the connector clips used on the top and bottom, in the preferred embodiment shown, are mitered at the corners 62. Otherwise, the connector clips are the same as used on the sides and described above.

From the foregoing description, it will be apparent that modifications can be made to the apparatus and method for using same without departing from the teachings of the present invention. Accordingly, the scope of the invention is only to be limited as necessitated by the accompanying claims.

I claim:

1. A panel connecting clip for joining adjacent grooved panels comprising:
    a first channel including a base positioned at the rear of said first channel, said first channel having an inner side wall and an outer side wall extending forwardly from said base;
    a second channel attached transversely to said first channel and including a base positioned at the rear of said second channel, said second channel having an inner side wall and an outer side wall extending forwardly from said base; and groove engaging means within said first and second channels comprising a ridge projecting from a side wall of each of said respective channels, said ridge exhibiting a forward sloping front side and a substantially perpendicularly projecting rear catch side.

2. The panel connecting clip of claim 1 wherein said panel connecting clip comprises an integral unit.

3. The panel connecting clip of claim 1 wherein said first and second channels are affixed one to the other in perpendicular relation.

4. The panel connecting clip of claim 1 wherein said base of said second channel is positioned to abut said inner side wall of said first channel.

5. The panel connecting clip of claim 1 wherein said ridges are positioned to project from said inner side walls of said respective channels.

6. A panel assembly comprising:

a plurality of panels, wherein each of said panels includes grooves defined along adjoining sides of each respective panel; and a panel connecting clip positioned to connect adjoining panels, wherein each respective clip comprises;

a first channel including a base defined at the rear of said first channel, said first channel having an inner side wall and an outer side wall extending forwardly from said base, a second channel attached transversely to said first channel and including a base defined at the rear of said second channel, said second channel having an inner side wall and an outer side wall extending forwardly from said base, and groove engaging means within said first and second channels comprising a ridge projecting from a side wall of each of said respective channels, said ridge exhibiting a forward sloping front side and a substantially perpendicularly projecting rear catch side.

7. The panel connecting clip of claim 6 wherein said first and second channels are affixed one to the other in perpendicular relation.

8. The panel connecting clip of claim 6 wherein said base of said second channel is positioned to abut said inner side wall of said first channel.

9. The panel connecting clip of claim 6 wherein said ridges are positioned to project from said inner side walls of said respective channels.

10. The panel connecting clip of claim 6 wherein said panel connecting clip comprises an integral unit.

* * * * *